(12) United States Patent
    Packard (10) Patent No.: US 11,095,108 B2
(45) Date of Patent: Aug. 17, 2021

(54) POINT OF USE PROTECTIVE WIRING DEVICE

(71) Applicant: Pass & Seymour, Inc., Syracuse, NY (US)

(72) Inventor: Thomas N. Packard, Syracuse, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 145 days.

(21) Appl. No.: 16/439,212

(22) Filed: Jun. 12, 2019

(65) Prior Publication Data

US 2019/0386479 A1    Dec. 19, 2019

Related U.S. Application Data

(60) Provisional application No. 62/684,295, filed on Jun. 13, 2018.

(51) Int. Cl.
| | | |
|---|---|---|
| *H02H 3/04* | (2006.01) | |
| *H02H 1/00* | (2006.01) | |
| *H01H 71/12* | (2006.01) | |
| *H01H 71/58* | (2006.01) | |
| *H02H 3/08* | (2006.01) | |

(52) U.S. Cl.
CPC ........ *H02H 1/0015* (2013.01); *H01H 71/128* (2013.01); *H01H 71/58* (2013.01); *H02H 3/044* (2013.01); *H02H 3/08* (2013.01); *H01H 2300/03* (2013.01)

(58) Field of Classification Search
CPC    H02H 3/338; H02H 3/38; H02H 3/28; H02H 3/162; H02H 3/093; H02H 3/00; H02H 3/44; H02H 3/334; H02H 3/32; H02H 3/04; H02H 3/07; H02H 3/335; H02H 1/0061; H02H 1/0015; H02H 7/30; H02H 7/04; H02H 5/083; H02H 5/10; H02H 5/105; H02H 9/04; B60L 3/0069
See application file for complete search history.

(56) References Cited

U.S. PATENT DOCUMENTS

2015/0288165 A1* 10/2015  Fu ............................. H02H 7/30
                                                                                  361/96
2017/0170649 A1*  6/2017  Chen ...................... H02H 3/334

* cited by examiner

*Primary Examiner* — Bryan R Perez
(74) *Attorney, Agent, or Firm* — Bond, Schoeneck & King, PLLC; Frederick Price (57) ABSTRACT

The present invention is directed to protective wiring devices, and more particularly, to a protective wiring device that meets the prevailing electrical codes and is convenient for a homeowner to reset after it has tripped.

40 Claims, 9 Drawing Sheets

POINT OF USE PROTECTIVE WIRING DEVICE

CROSS-REFERENCE TO RELATED APPLICATIONS

This application claims priority to U.S. Provisional Patent Application Ser. No. 62/684,298 filed on Jun. 13, 2018, the contents of which is relied upon and incorporated herein by reference in its entirety.

1. FIELD OF THE INVENTION

The invention relates generally to protective wiring devices, and more particularly, to a protective wiring device that meets the prevailing electrical codes and is convenient for a homeowner to reset after it has tripped.

2. DESCRIPTION OF RELATED ART

Protective devices are commonplace in residential and commercial building spaces and designed to interrupt power when there is an electrical fault condition in the electrical distribution system. These devices include circuit breakers installed at the origin of each branch circuit and housed in a load center, and electrical wiring devices installed within branch circuits, typically housed in an outlet box. The conductors that connect the circuit breaker to line terminals of the wiring device are referred to as upstream conductors, whereas conductors that connect load terminals of the wiring device to a load are referred to as downstream conductors. Load terminals can be feed-through load terminals that connect to a downstream receptacle, or user load terminals typically located on the face of the device housing that receive appliance plugs.

A protective device senses electrical fault conditions and opens the connections between its line and load terminals (trips) to interrupt the fault condition before it becomes hazardous. Ground fault circuit interrupters (GFCIs) interrupt current flowing through a person who has come in contact with a live conductor at the same time as ground, before there is an electrocution or serious burn. These devices typically operate at 6 mA. Arc fault circuit interrupters (AFCIs) interrupt series arc faults that can occur across an electrical discontinuity in series with a load. The impedance of the load limits the amount of current that can flow through a series arc fault. Series arc faults can occur at a loose electrical terminal or inside a twist-on connector. AFCIs can also interrupt parallel arc faults that can occur across hot (phase) and neutral or ground conductors where there is missing insulation. The current through a parallel arc fault is limited by the source impedance. Currents through an arc fault may range between a few milliamperes to 500 Amperes. AFCIs interrupt the current through the arc fault before nearby combustibles are heated enough by the arc to set on fire. Overload (O/L) devices interrupt current through bolted fault conditions and typically operate at 15 and 20 Amperes. Overload devices interrupt sustained currents before the branch circuit wiring (or the protective device itself) becomes damaged. Ground fault equipment protectors (GFEPs) are similar to the GFCI but interrupt higher level ground faults such as 30 mA. Thermal protectors interrupt power to a load before it can overheat. These types of protective devices, set forth as examples, may also be provided in mix-and-match combination.

Although protective devices are good at what they do, they have been known to trip without a hazardous condition being present (nuisance-tripping). AFCI and GFCI nuisance tripping has been known to be caused by "every-day arcs" such as to occur during bulb burn-out, wall switch operation, noisy appliance operation, etc.

Prevailing electrical codes (the National Electrical Code) define what protection is to be provided to the branch circuit, both the upstream portion and the downstream portion. In particular, the code requires parallel and series arc fault protection of the entire branch circuit. Whereas AFCI receptacles can sense and interrupt series upstream and downstream arcs and parallel downstream arc, they cannot interrupt upstream parallel arcs. To overcome this short-coming AFCI receptacles have been permitted if used in combination with robust mechanical protection of the upstream conductors. The mechanical protection reduces the chances of a parallel arc fault occurring. Unfortunately this is not cost effective. As a result, AFCI circuit breakers (to the exclusion of AFCI receptacles) have been the accepted way to meet the code, and the homeowner is not afforded a receptacle alternative. Where this is of concern is circuit breaker load centers are remotely located in basements or garages. It becomes inconvenient for handicapped homeowners and those in general, to reset a tripped interrupter.

Therefore, there is a need for an AFCI device that meets the prevailing electrical codes. There is also a need for an AFCI device that is convenient for a homeowner to reset after it has tripped.

SUMMARY OF THE INVENTION

The present invention is directed to protective wiring devices, and more particularly, to a protective wiring device that meets the prevailing electrical codes and is convenient for a homeowner to reset after it has tripped. In one embodiment, the present invention includes an electrical wiring device for installation in a branch circuit of an electrical distribution system for delivering power from a power source to a load, and a circuit breaker being disposed at the origin of the branch circuit. The device can include, but is not limited to, a housing including a front cover and a back body; a plurality of line terminals at least partially disposed in the housing and configured to be coupled to upstream portions of the plurality of conductors extending between a circuit breaker at the origin of the branch circuit and the plurality of line terminals; a plurality of load terminals at least partially disposed in the housing including user load terminals or feed-through load terminals and configured to be coupled to downstream portions of the plurality of conductors extending between the plurality of load terminals to the load; a protective circuit disposed inside the housing including: a directional arc fault sensor assembly comprising a sensor element and a filter element, the sensor element being configured to sense at least one fault condition when propagating on the downstream portion of one of the conductors, the filter element being configured to divert the at least one fault signal when propagating on the line portion of the conductor to another of the plurality of conductors, the filter element substantially preventing the sensor element from being able to sense the at least one fault condition when propagating on the upstream portion of the conductor; an arc fault detector configured to generate an arc fault detection signal when the sensor element generates a sensor signal that exceeding a predetermined threshold; a switching element configured to generate a trip signal in response to the arc fault detection signal; and a circuit interrupter coupled to the switching element, the circuit interrupter being configured to disconnect the plurality of load terminals from the plurality of line terminals in a tripped state in response to the trip signal, the circuit interrupter being configured to connect the plurality of line terminals and the plurality of load terminals in a reset state, wherein the circuit interrupter remains in the reset state when the fault condition at the predetermined threshold is propagating on the upstream portion of the conductor but enters the tripped state when the fault condition at the predetermined threshold is propagating in the downstream portion of the conductor.

In accordance with another embodiment, a protective electrical wiring device to be installed in a branch circuit of an electrical distribution system for delivering power from a power source to a load by way of a plurality of conductors, and a circuit breaker being disposed at the origin of the branch circuit providing arc fault protection is provided. The device can include, but is not limited to a housing including a front cover and a back body; a plurality of line terminals at least partially disposed in the housing and configured to be coupled to upstream portions of the plurality of conductors extending between the circuit breaker and the plurality of line terminals; a plurality of load terminals at least partially disposed in the housing including user load terminals or feed-through load terminals and configured to be coupled to downstream portions of the plurality of conductors extending between the plurality of load terminals to the load; a protective circuit disposed inside the housing including: a directional arc fault sensor assembly comprising a sensor element and a filter element, the sensor element being configured to sense at least one fault condition when propagating on the downstream portion of one of the conductors, the filter element being configured to divert the at least one fault signal when propagating on the line portion of the conductor to another of the plurality of conductors, the filter element substantially preventing the sensor element from being able to sense the at least one fault condition when propagating on the upstream portion of the conductor; an arc fault detector configured to generate an arc detection signal when the sensor element generates a sensor signal exceeding a predetermined threshold; a switching element configured to generate a trip signal in response to the arc detection signal; and a circuit interrupter coupled to the switching element, the circuit interrupter being configured to disconnect the plurality of load terminals from the plurality of line terminals in a tripped state in response to the trip signal, the circuit interrupter being configured to connect the plurality of line terminals and the plurality of load terminals in a reset state, wherein the circuit breaker remains in the reset state when the fault condition at the predetermined threshold is propagating on the downstream portion of the conductor but enters the tripped state when the fault condition at the predetermined threshold is propagating in the upstream portion of the conductor.

In accordance with a further embodiment, a protective system for protecting a branch circuit in an electrical distribution system, the branch circuit including an upstream portion and a downstream portion is provided. The system can include, but is not limited to a circuit breaker configured to be installed at the origin of the upstream portion of the branch circuit, the circuit breaker having a fault sensor configured to sense an arc fault signal propagating on at least one conductor in the branch circuit, an arc fault detector configured to generate a breaker trip signal when the arc fault signal is greater than or equal to a threshold of detection, and a circuit breaker configured to disconnect the branch circuit from a power source in response to the breaker trip signal; and an electrical wiring device configured to be installed at the origin of the downstream portion of the branch circuit, the electrical wiring device including a directional fault sensing assembly having a fault sensing element and a filtering element configured to sense the arc fault signal, a fault detecting element configured to generate a wiring device trip signal when the arc fault signal is greater than or equal to the threshold of detection, and a circuit interrupter configured to disconnect the downstream portion of the branch circuit from the upstream portion of the branch circuit in response to the wiring device trip signal, the filtering element being configured to prevent the arc fault detector from detecting the arc fault signal when located on a downstream portion of the at least one conductor.

In accordance with another embodiment, a method of protecting a branch circuit in an electrical distribution system coupled to a power source, the branch circuit including a plurality of conductors, each conductor having an upstream portion and a downstream portion, the method comprising: actuating a first interrupting device at the origin of the upstream portion of the branch circuit to interrupt power to the branch circuit when an arc fault signal at a threshold of detection propagates in at least one conductor in the upstream portion but not in the downstream portion of one of the conductors; and actuating a second interrupting device at the origin of the downstream portion of the branch circuit to interrupt power when the arc fault signal at the threshold of detection propagates in the downstream portion of the at least one conductor.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following description taken in conjunction with the accompanying drawings in which:

DETAILED DESCRIPTION OF THE INVENTION

Aspects of the present invention and certain features, advantages, and details thereof, are explained more fully below with reference to the non-limiting examples illustrated in the accompanying drawings. Descriptions of well-known structures are omitted so as not to unnecessarily obscure the invention in detail. It should be understood, however, that the detailed description and the specific non-limiting examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the protective electrical wiring device of the present invention is shown in FIG. 1, and is designated generally throughout by reference numeral 10.

Figure 1:
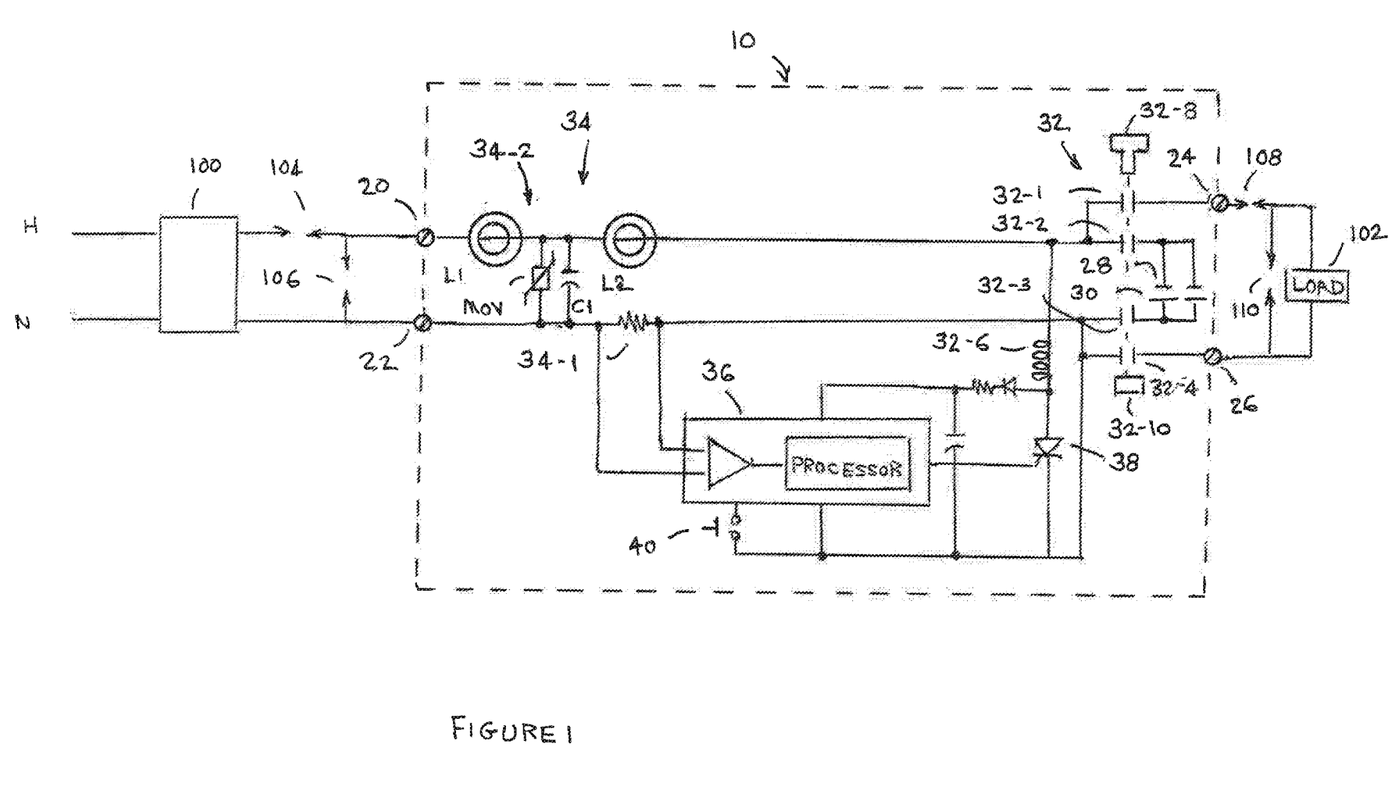
FIG. 1 is a schematic diagram of a protective wiring device according to an embodiment.

As embodied herein, and depicted in FIG. 1, AFCI 10 has a hot line terminal 20 and a neutral line terminal 22 to which upstream conductors are attached, connecting the device to a conventional AFCI circuit breaker 100 disposed at the origin of the branch circuit. Line terminals 20,22 may be connected to breaker 100 by way of one or more upstream receptacle (not shown). A hot feed-through load terminal 24 and a neutral feed-through load terminal 26 are used for connecting downstream conductors to a load 102. Load terminals 24,26 may be connected to load 102 by way of a downstream receptacle or downstream receptacles in series (daisy-chained) (not shown). A hot receptacle load terminal 28 and a neutral receptacle load terminal 30 (also referred to as load terminals (28,30) mate with a user attachable plug connected by a cord-set to the load. Hot terminals 20,24,28 are disconnected from each other when circuit interrupter 32 is in a tripped state as are neutral terminals 22,26,30. Hot terminals 20,24,28 are connected to each other when circuit interrupter 32 is in a reset state, as are neutral terminals 22,26,30. To accomplish this, interrupter has four sets of interrupting contacts 32-1, 32-2, 32-3, 32-4 and a solenoid 32-6 that effects the tripped state when energized. The reset state is accomplished by manually depressing a reset button 32-8 coupled to a reset mechanism 32-10. For a more complete description of circuit interrupter 32, U.S. Pat. No. 8,299,799 issued on Oct. 30, 2012 is incorporated herein by way of reference in its entirety.

Various arcing conditions may arise in the branch circuit, the branch circuit being defined to include load 102. Spark gap 104 represents a series upstream arc in a line conductor and spark gap 106 represents a parallel upstream arc associated with the line side conductors. Spark gap 108 represents a series downstream arc and spark gap 110 represents a parallel downstream arc associated with the load side conductors. As will be explained, AFCI 10 is configured to ignore a series arc fault 104 but interrupt series arc fault 108 even though they are of the same magnitude.

AFCI 10 includes a protective circuit including a directional arc fault sensor 34, detector 36, SCR 38, and circuit interrupter 32. Directional arc fault sensor 34 includes a shunt sensor 34-1 and a filter circuit 34-2. When there is a series arc fault 108 or parallel arc fault 110, shunt 34-1 provides a voltage signal related to the load current and the arc current. The voltage signal includes a power line frequency component (50 Hz or 60 Hz) related to the current through load 102, and high frequency components (greater than 100 kHz) through arc fault 108 or arc fault 110. Filter circuit 34-2 includes capacitor C1 that together with the inductance associated with the downstream conductors, comprises a low pass filter. Since shunt 34-1 is located on the downstream side of filter 34-2, the filter does not impede shunt 34-1 from being able to sense the high frequency components (arc faults 108,110). Shunt 34-1 is connected to detector 36 which is configured to ignore the power line frequency component and analyze the high frequency components in the voltage signal, typically greater than 100 kHz. If the high frequency components meet predetermined criteria, detector 36 sends a fault detection signal to turn SCR 38 ON. SCR 38 then energizes solenoid 32-6 to trip circuit interrupter 32 automatically.

Circuit interrupter 32 can be tripped by manually depressing test button 40. When depressed, test button 40 generates a signal that simulates a true fault condition for checking the operability of AFCI 10, or a portion thereof. If the portion being tested is at end of life and AFCI 10 is no longer protective, interrupter 32 will fail to trip. Reset button 32-8 and test button 40 are both integral to AFCI 10.

AFCI circuit breaker 100 would also be capable of sensing, detecting and interrupting arc fault 108 or arc fault 110 were it not for directional arc fault sensor 34 preventing the circuit breaker's arc fault sensor from sensing those fault conditions. Directional arc fault sensor 34 comprises an arc fault sensor 34-1 and a low pass filter including Capacitor C1. Capacitor C1 and the inductance of the downstream conductor comprise a low pass filter. In an embodiment of the invention low pass filter 34-2 also includes a coil L2 having typically one or two turns, disposed in the phase or neutral path of AFCI 10, to augment the downstream inductance. Whereas the voltage on C1 tracks the line voltage, virtually all the high frequency signal associated with spark gap 108 or spark gap 110 is shorted by capacitor C1, so little or no high frequency current signal circulates through the breaker's arc fault sensor. Even though capacitor C1 has shorted the high frequency components, this has little or no effect on the ability of shunt 34-1 to sense the high frequency signals associated with arc fault 108 or arc fault 110. As a result, AFCI 10 consistently interrupts a series downstream or parallel arcing condition, whereas AFCI breaker 100 consistently ignores a series or parallel downstream arcing condition. A metal oxide varistor (MOV) may be incorporated to protect capacitor C1 from over-voltage transients that occur on the electrical distribution system. For a more complete description of an AFCI circuit, PCT App. No. PCT/US18/34117 filed on May 23, 2018 is hereby incorporated herein by way of reference in its entirety.

Furthermore, directional arc fault sensor 34 prevents shunt sensor 34-1 in AFCI 10 from sensing arc fault 104. Capacitor C1 and the inductance of the upstream conductor comprise a low pass filter. In an embodiment of the invention, low pass filter 34-2 includes a coil L1 having typically one or two turns disposed in the phase or neutral path of AFCI 10, to perceivably augment the upstream inductance (coil L1 may or may not be included). Whereas the voltage on C1 tracks the line voltage, virtually all the high frequency signal associated with spark gap 104 is shorted by capacitor C1. Little or no high frequency current signal circulates through shunt 34-1 in AFCI 10. Even though capacitor C1 has shorted the high frequency components, this has little or no effect on the ability of AFCI breaker 100 to sense the high frequency signals associated with arc fault 104 (or arc fault 106). As a result, the AFCI breaker consistently interrupts a series or parallel upstream arcing condition, whereas AFCI 10 consistently ignores a series upstream arcing condition.

Figure 2A:
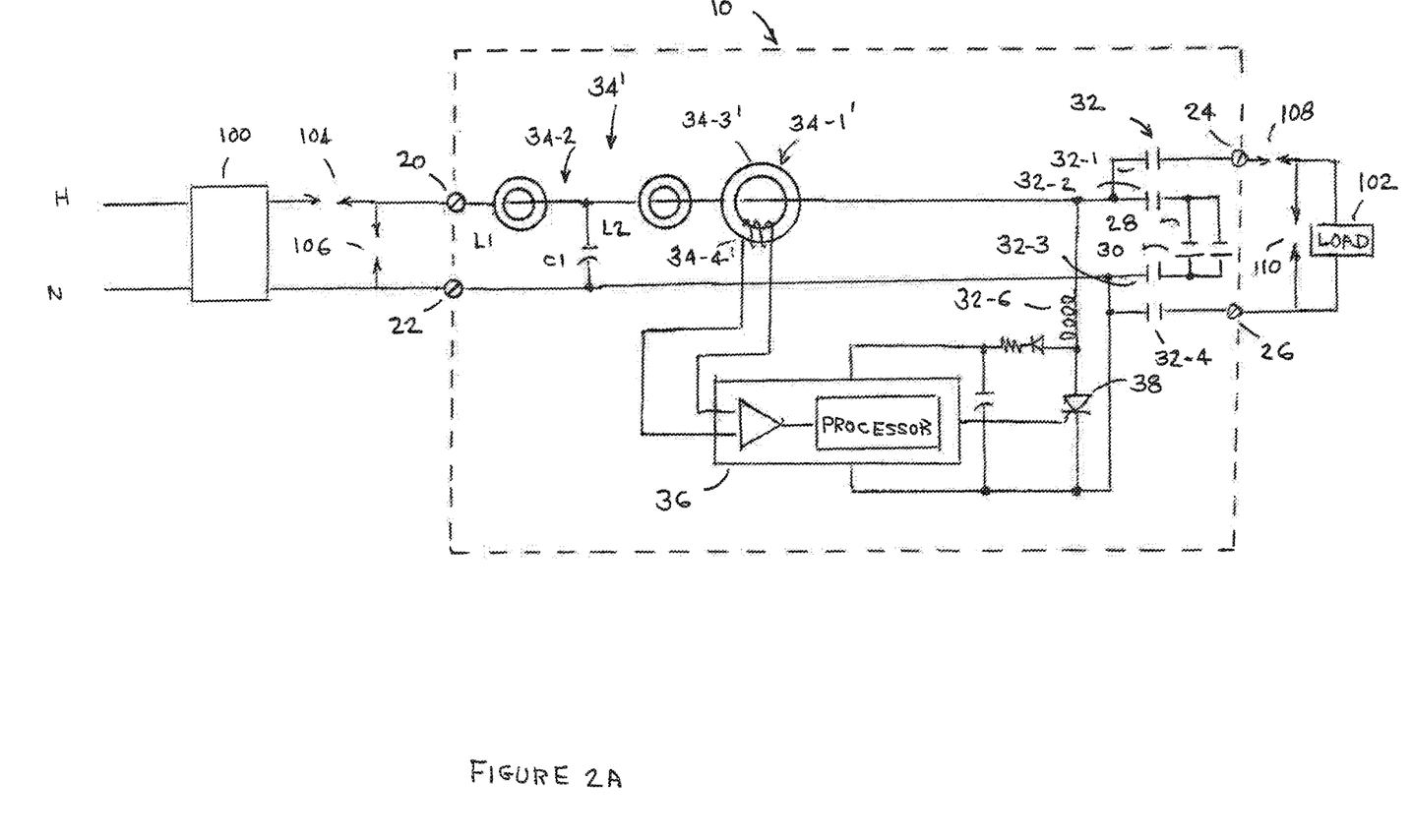
FIG. 2A is a schematic diagram of a protective wiring device according to an embodiment.

Referring to FIG. 2A, another embodiment of the invention is shown. The operation is similar to FIG. 1 except directional arc fault sensor 34' has a toroidal sensor 34-1' that takes the place of shunt sensor 34-1 for arc sensing. Toroidal sensor 34-1' is inductively coupled to the phase conductive path through device 10, or in an alternate embodiment of the invention (not shown), to the neutral conductive path through device 10. Sensor 34-1' has a multi-turn secondary winding 34-4' wound on a core 34-3' made out of plastic, a ferrite material, a non-magnetic material, or a magnetic material. In response to high frequencies on the phase (or neutral path) indicative of arc fault 108 or arc fault 110, sensor 34-1' induces di/dt signal on secondary winding 34-4'. Secondary winding 34-4' is connected to detector 36 which analyzes the di/dt components, generating the fault detection signal if the high frequency components meet predetermined criteria.

Figure 2B:
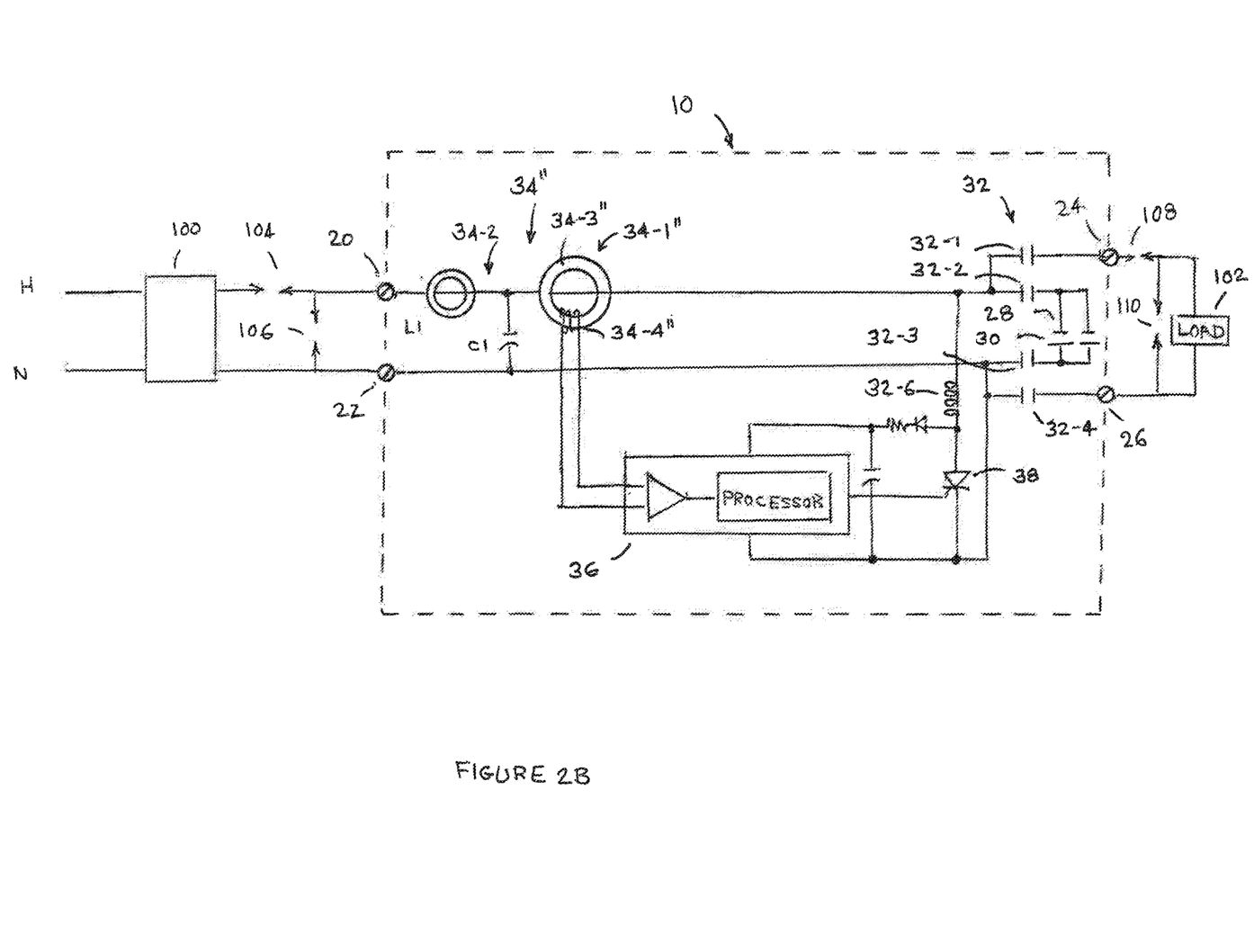
FIG. 2B is a schematic diagram of a protective wiring device according to an embodiment.

FIG. 2B shows an alternate embodiment of the invention similar to the one in FIG. 1, except directional arc fault sensor 34" has a toroidal sensor 34-1" replacing shunt sensor 34-1 and inductor L2. Toroidal sensor 34-1" serves as an arc fault sensor in place of shunt 34-1, and as a filtering component in place of L2. Toroidal sensor 34-1" is inductively coupled to the phase conductive path or in an alternate embodiment of the invention (not shown), to the neutral conductive path through device 10. Sensor 34-1" has a multi-turn secondary winding 34-4" wound on a core 34-3" made out of plastic, a ferrite material, a non-magnetic material, or a magnetic material. In response to high frequencies on the phase (or neutral path) indicative of arc fault 106 or arc fault 108, sensor 34-1" induces di/dt signal on multi-turn winding 34-4". Multi-turn winding 34-4" is connected to detector 36 which analyzes the di/dt components, generating the fault detection signal if the high frequency components meet predetermined criteria.

AFCI breaker 100 is required to sense, detect and interrupt parallel arc fault conditions associated with the phase and neutral conductors, furthermore between the phase conductor and ground. For circuit breakers that rely on high frequency signal to detect parallel arc faults to ground, the filter portion 34-2, 34-2', 34-2" will be effective at preventing the breaker from interrupting that type of arc fault when located in the downstream wiring (arc fault 312 shown in FIGS. 3A-B). However, circuit breakers have also been known to sense low frequency signals typically in a range between 60 Hz and 10 kHz to detect parallel arc faults to ground (such breakers will be referred to as AFCI breaker 300). Unfortunately at these low frequencies, the capacitive reactance of capacitor C1 in filter portion 34-2, 34-2' or 34-2" is not low enough to prevent the breaker from sensing, detecting and interrupting downstream parallel arc faults to ground.

Figure 3A:
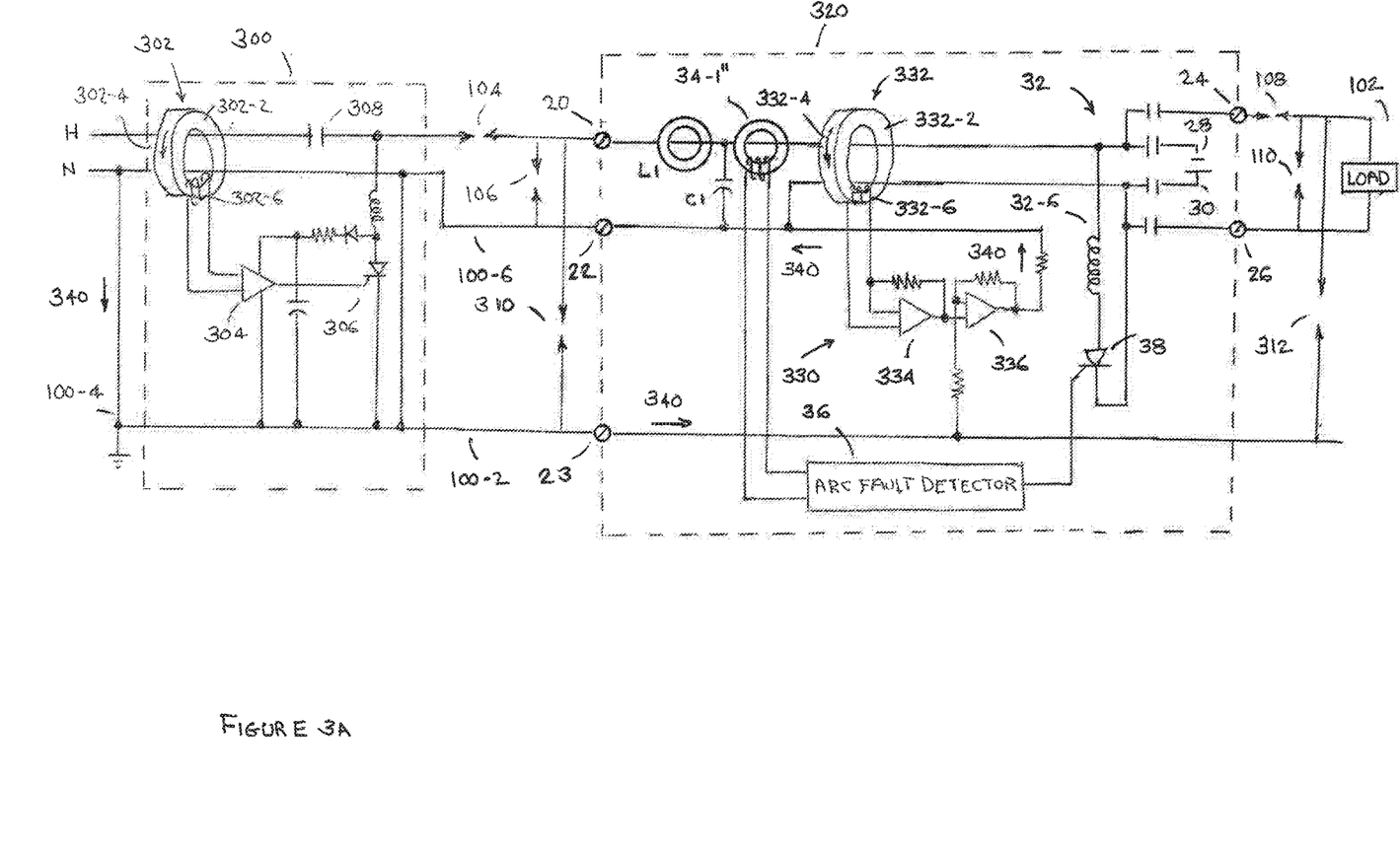
FIG. 3A is a schematic diagram of a protective wiring device according to an embodiment.

Referring to FIG. 3A, an embodiment of an AFCI device 320 is shown that prevents AFCI breaker 300 from sensing downstream parallel arc faults to ground (fault 312), but not upstream parallel arc faults to ground (fault 310). Low frequency arc fault sensor 302, to be referred to as differential transformer 302, includes a toroidal core 302-2. The phase and neutral conductors pass through the opening of toroidal core 302-2 constituting two single turn primaries, and connect respectively to line terminals (20,22) of device 320 when the interrupting contact 308 is reset. A multi-turn winding 302-6 is wound on core 302-2, constituting a secondary winding. Ordinarily the currents on the phase and neutral conductors are equal and opposite, to and from load 102. Thus the magnetic fields induced by the two primary windings in core 302-2 are equal and opposite, so there is little or no net magnetic flux circulating in core 300-2, and thus little or no signal on secondary winding 302-6. However, when a parallel arc fault condition to ground is present, represented by arc fault 310, the fault current will flow on the phase conductor but instead of returning entirely on the neutral conductor, some or even all will return on a nearby ground conductor or a spurious ground path. Current flowing through the neutral conductor will be less than that on the hot (or phase) conductor so there will be a net flux 302-4. If the resulting signal induced in secondary winding 302-6 is greater than a threshold, detector 304 will generate a fault detection signal. Switch 306 will activate interrupter 308 to interrupt the fault condition. Detector 304 is generally calibrated to generate the fault detection signal when the difference between the currents on the phase and neutral conductors (the differential current) is greater than 20 mA, however, if the circuit breaker 300 includes a GFCI, the trip threshold is set to 6 mA. AFCI breaker 300 includes high frequency arc fault sensors (not shown) for sensing series arc fault 104 or parallel arc fault 106.

AFCI device 320 prevents breaker 300 from interrupting downstream arc faults 108,110 using a directional sensor (34,34',34") as has been described. Further, device 320 prevents breaker 300 from interrupting downstream arc fault 312. As will be described, a cancellation circuit 330 is included that augments the current returning on the neutral conductor by the differential current. When that happens, the currents on the phase and neutral upstream conductors become equal and opposite so there is little or no differential current for AFCI 300 to sense. As a result, AFCI 300 is unresponsive to arc fault 312.

Cancellation circuit 330 includes a differential transformer 332, amplifiers (334,336) and a resistor 338. Differential transformer 332 senses parallel arc fault to ground currents whose frequency components range between the line frequency (typically 50 or 60 Hz) to about 10 kHz. Transformer 332 includes a toroidal core 332-2. Core 332-2 is made out of a ferrite, ring laminate, or magnetic material. The phase and neutral conductors pass through the opening of toroidal core 332-2, each constituting a single turn primary winding. Ordinarily the currents on the phase and neutral conductors to and from the load 102 are equal and opposite (the vectorial sum of the two currents is zero). Thus the magnetic fields induced by the two primary windings in core 332-2 cancel each other, so there is little or no magnetic flux circulating in core 332-2 and consequently little or no signal induced on secondary winding 332-6. When arc fault 312 is present, the fault current will flow on the phase conductor but some or even all will return on the nearby ground conductor or a spurious ground path instead of on the neutral conductor, causing a net flux 332-4. The resulting signal induced in secondary winding 332-6 is amplified by amplifier 334. The amplifier 334 output signal is fed to a second amplifier 336 to further boost the overall gain of cancellation circuit 330 without having to sacrifice circuit bandwidth. One of the input terminals of amplifier 336 is referenced to the line ground conductor 100-2 via ground terminal 23 of device 320. Ground conductor 100-2 is bonded at its upstream end 100-4 to the neutral conductor 100-6 at load center 100. Since the amplifier 336 input is referenced to ground conductor 100-2, the output voltage of amplifier 336 is a ground-referenced voltage source, the amount of voltage being proportional to the differential current between the phase and neutral conductors. Resistor 338 connects the output of amplifier 336 to neutral conductor 100-6. The voltage at the output of amplifier 336, acting like a voltage source, and the resistance of resistor 338 establish a circulating loop current represented by arrow 340. Loop current 340 flows on neutral conductor 100-6 to bonded connection 100-4 and returns on the ground conductor 100-2 to the other side of the amplifier 336 voltage source. Component vales in the cancellation circuit are chosen such that the loop current is substantially equal to the differential current. For a more complete description of the cancellation circuit, U.S. Pat. No. 8,289,664 issued on Oct. 16, 2012 is incorporated herein by way of reference in its entirety.

Of course, it is desirable to provide protective coverage of arc fault 312. Device 320 uses high frequency arc fault sensing technology that has been described, to provide that protection. As such, device 320 senses, detects and interrupts a parallel arc fault to ground (fault 312) in a similar manner as a phase to neutral arc fault (fault 110).

Figure 3B:
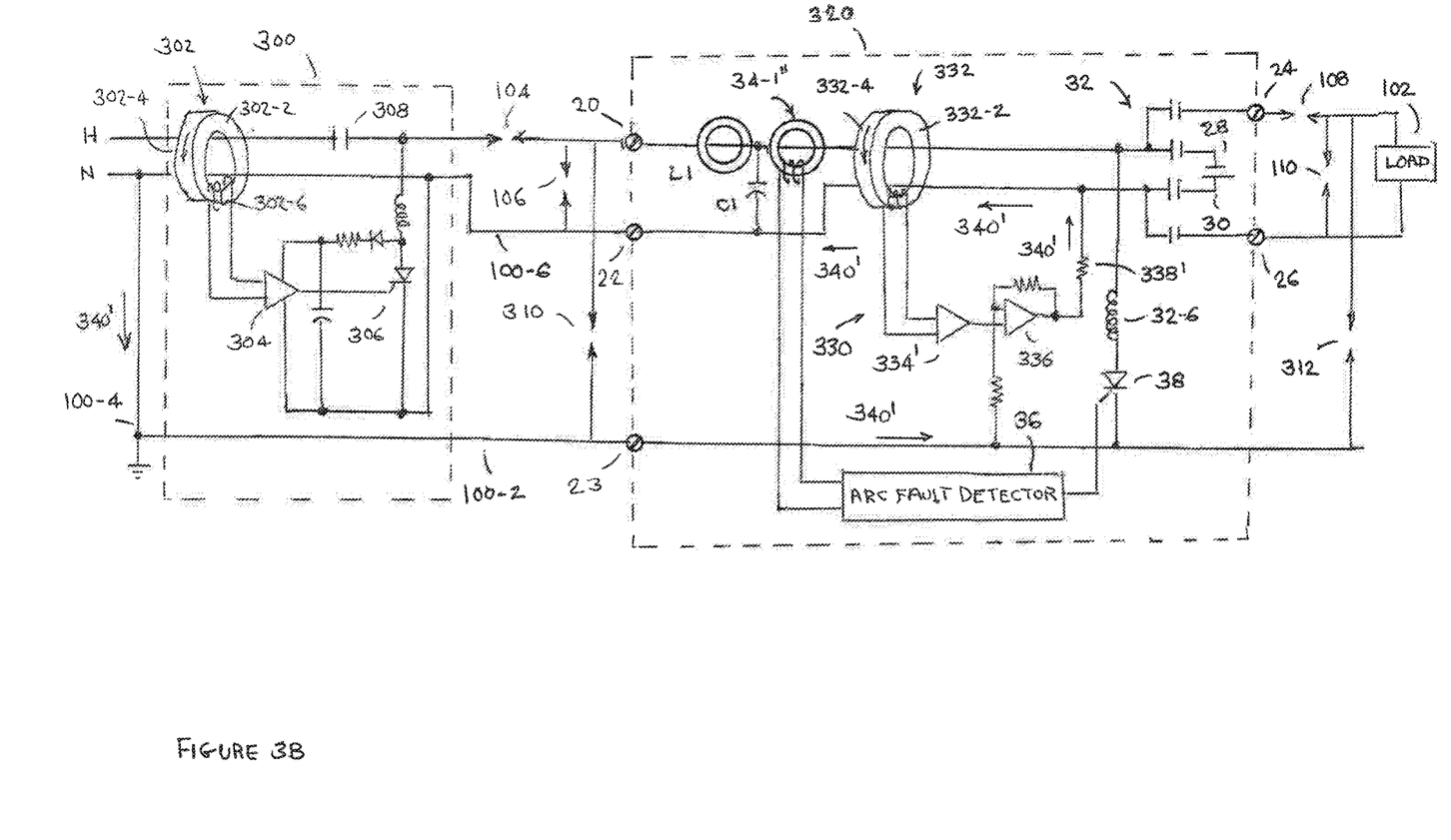
FIG. 3B is a schematic diagram of a protective wiring device according to an embodiment.

Referring to FIG. 3B, an alternate embodiment 320' of the invention is shown that is similar to FIG. 3A except resistor 338' of cancellation circuit 330 is connected to the neutral conductor on the load side of transformer 332 instead of the line side of transformer 332. Loop 340' is similar to loop 340 except it also passes through the opening in transformer 332. The cancellation circuit still serves to make the current on the neutral conductor and phase conductor equal and opposite due to loop 340' now serving as a negative feedback path. Due to the negative feedback path, the high gain of comparator 334' drives the difference between the phase and neutral currents, i.e. the signal on the secondary winding 332-6, to be negligible. When transformer 332 senses a differential current, the cancellation circuit causes a current of substantially the same magnitude to propagate on the neutral current.

It is desirable for device 320' to provide protective coverage of arc fault 312. Device 320' uses high frequency arc fault sensing technology that has been described, to provide that protection. In other words, device 320' senses, detects and interrupts a parallel arc fault to ground (fault 312) in a similar manner as a phase to neutral arc fault (fault 110).

Figure 4A:
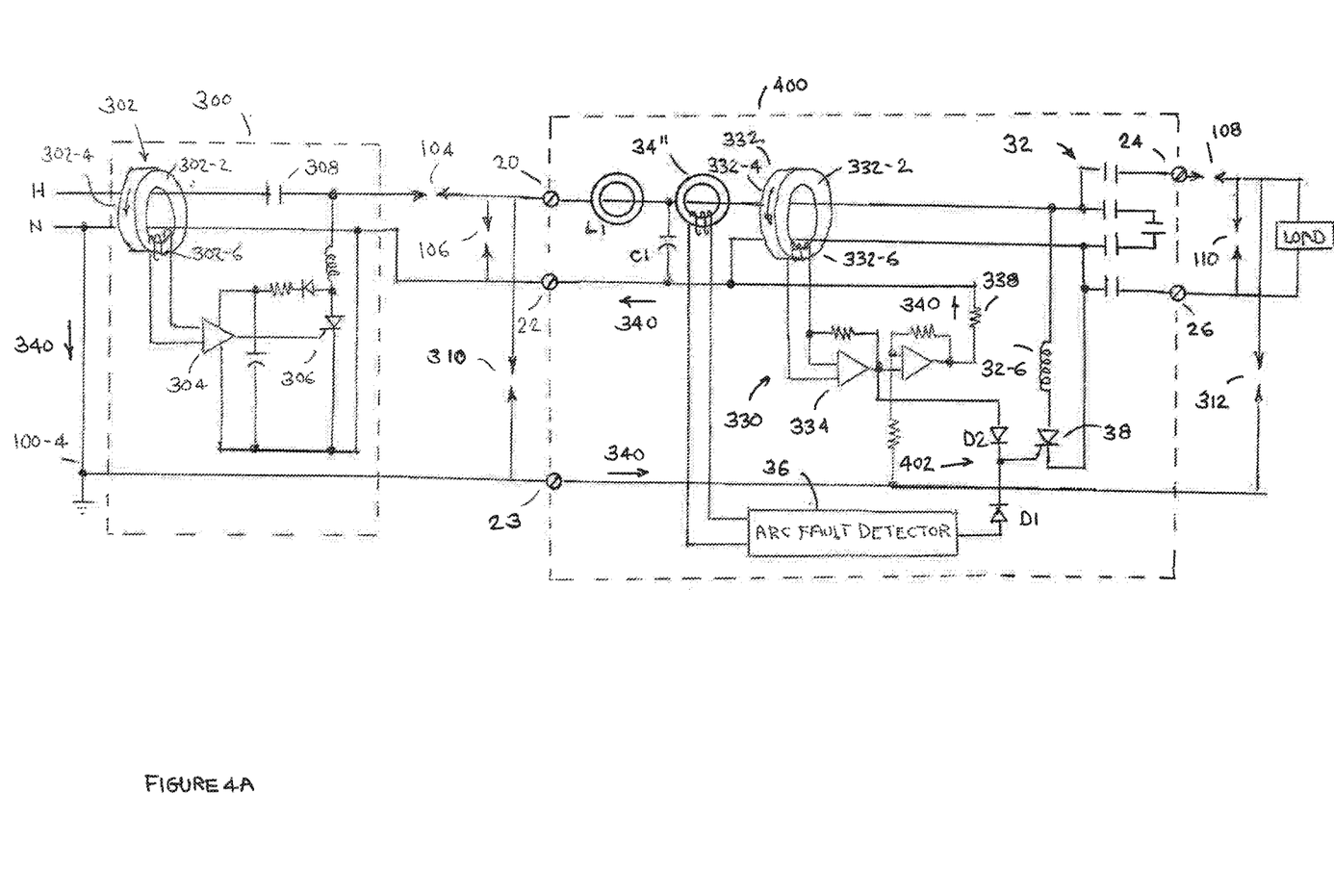
FIG. 4A is a schematic diagram of a protective wiring device according to an embodiment.

Referring to FIG. 4A, an embodiment 400 of the invention is shown that uses low frequency technology to sense fault 312. This embodiment is similar to FIG. 3A except OR gate 402 has been added. OR gate 402 includes a diode D1 and diode D2, providing two ways for device 10 to turn SCR 38 ON, to trip interrupter 32. Using high frequency arc detection technology, arc fault detector 36 provides a signal via diode D1 to trip the interrupter. Using low frequency arc detection technology, amplifier 334 provides a signal via diode D2 to trip the interrupter. Diode D2 may serve in a second capacity as the low frequency arc fault detector, conducting current to turn SCR 38 ON only if the signal from amplifier 334 is greater than the D2 diode drop. In other words, fault 312 becomes detected. The low frequency arc fault detector circuit may be calibrated to detect fault 312 currents greater than about 30 mA to avoid nuisance tripping, or to 6 mA when both arc fault and GFCI protection is to be provided.

Figure 4B:
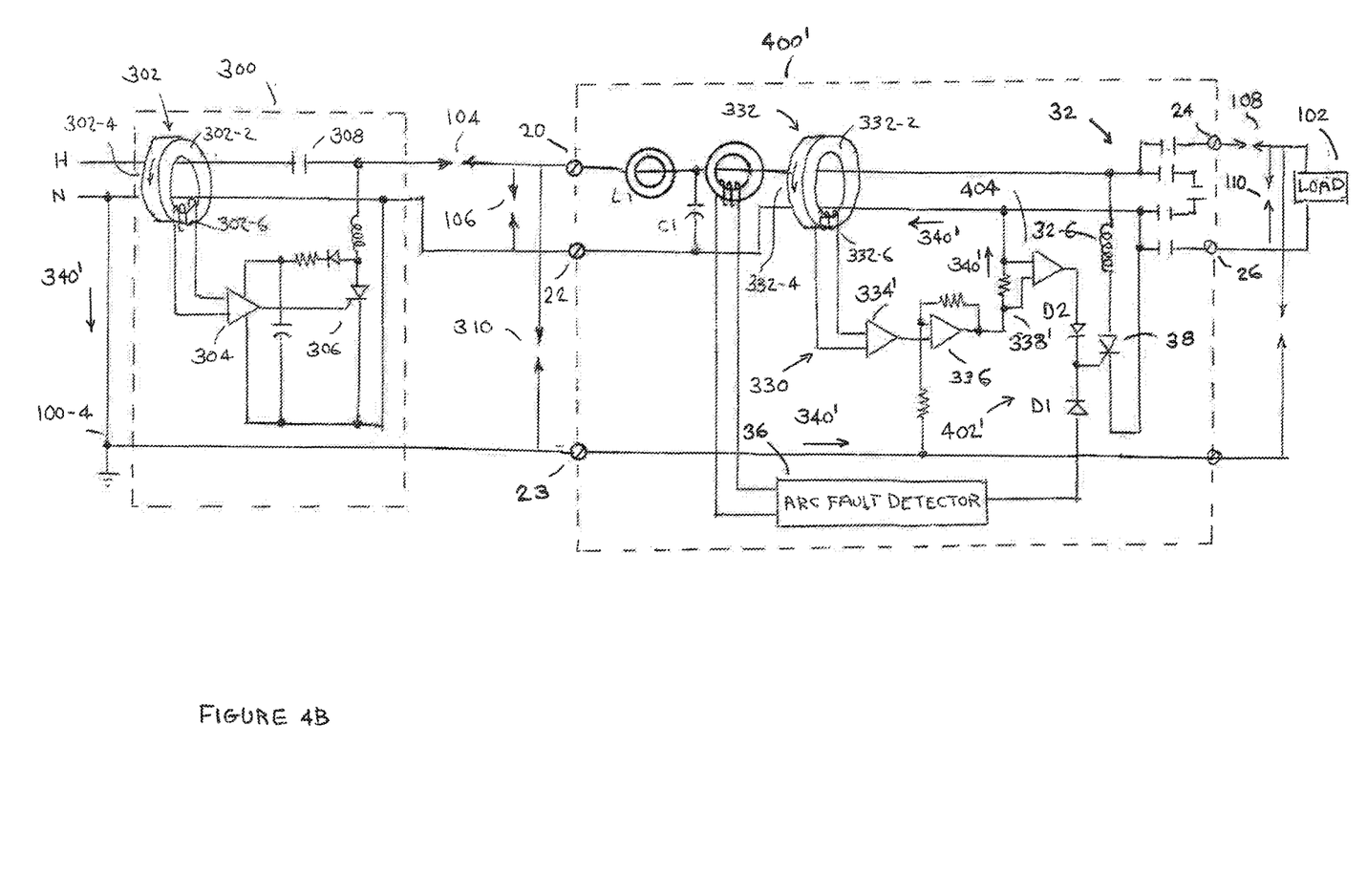
FIG. 4B is a schematic diagram of a protective wiring device according to an embodiment.

Referring to FIG. 4B, an embodiment 400' of the invention is shown that uses low frequency technology to sense fault 312. This embodiment is similar to FIG. 3B except OR gate 402' has been added. OR gate 402' provides two ways for device 10 to turn SCR 38 ON, to trip interrupter 32. Using high frequency arc detection technology, arc fault detector 36 provides a signal via diode D1 to trip the interrupter. Using low frequency arc detection technology, differential amplifier 404 converts the current through resistor 338' into a voltage signal to trip the interrupter via diode D2. Diode D2 may serve in a second capacity as the low frequency arc fault detector, conducting current to turn SCR 38 ON only if the signal from amplifier 404 is greater than its diode drop. The low frequency arc fault detector may be calibrated to respond to fault 312 currents greater than about 30 mA to avoid nuisance tripping, or to 6 mA when both arc fault and GFCI protection is to be provided.

Figure 5:
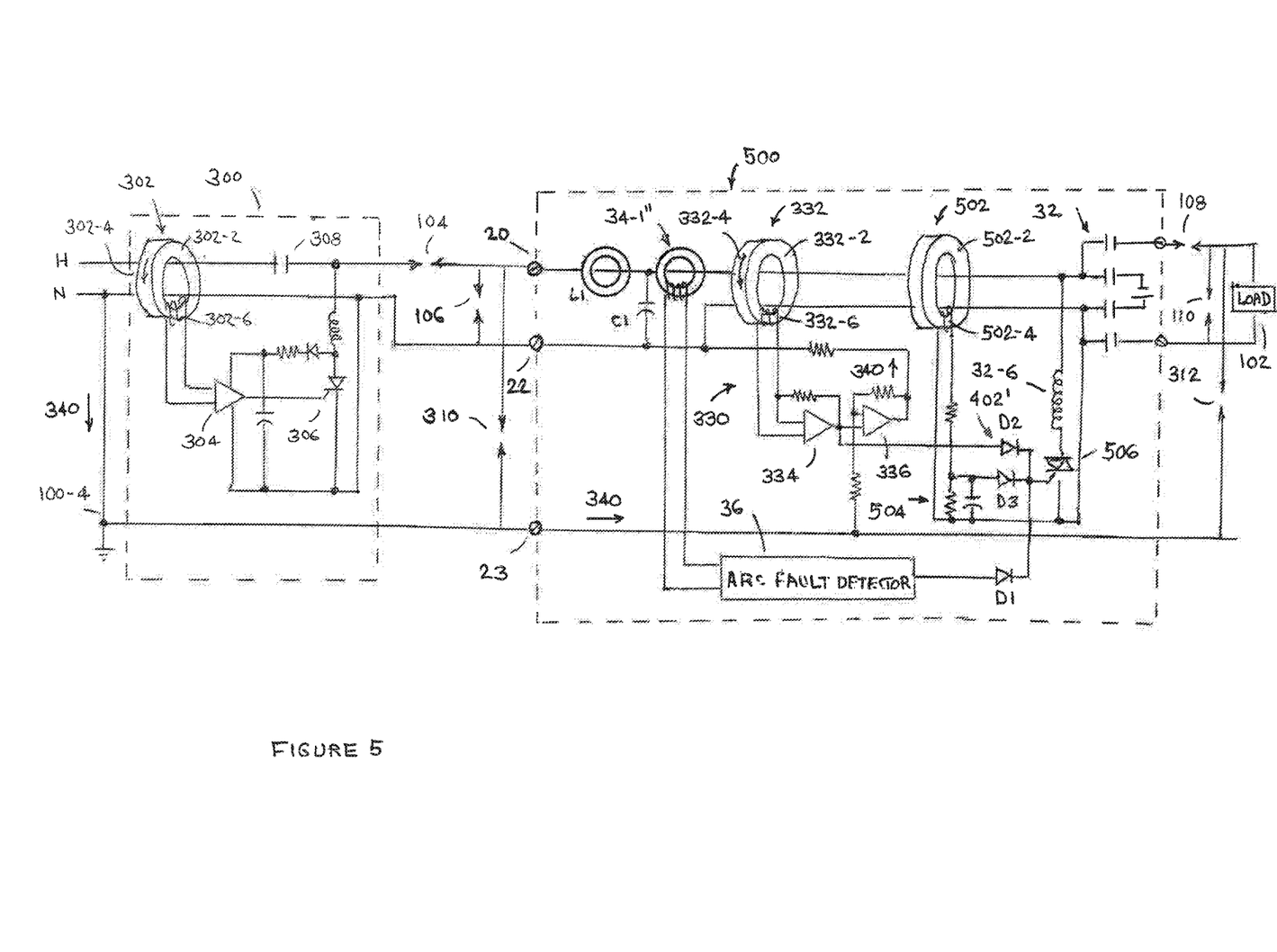
FIG. 5 is a schematic diagram of a protective wiring device according to an embodiment.

Referring to FIG. 5, an embodiment 500 of the invention is shown that uses a saturating transformer to sense fault 312. This embodiment is similar to FIG. 4A except a saturating transformer 502, a pulse stretching network 504, and an OR gate 402' has been added. SCR 38 has been replaced by a bi-directional electronic switch 506. OR gate 402' is similar to OR gate 402 except a third input, diode D3, has been added. Due to OR gate 402' having three inputs, it will be shown that device 500 has three different ways to interrupt an arc fault.

Unfortunately cancellation circuit 330 cannot propagate unlimited amounts of loop current 330,330'. In one embodiment of the invention, the cancellation circuit can provide up to 100 mA of loop current without the circuit itself saturating. In other words, that embodiment can accommodate up to 100 mA of differential current through fault 312. As will be described, saturating transformer feature 502 prevents breaker 300 from interrupting fault 312 when conducting higher levels of current.

Saturation transformer 502 is a differential transformer through which the phase and neutral conductors pass to form two single turn primaries. Under normal circumstances, the currents to and from load 102 are equal and opposite so there is little or no net flux in core 502-2 and thus little or no signal on secondary winding 502-4. However when there is a high current level arc fault condition to ground that would cause cancellation circuit 330 to saturate, saturation transformer 502 is producing strong impulses at the zero crossings of the power line frequency. Pulse stretcher 504 widens the impulses. If a broadened impulse has enough amplitude to forward bias D3, switch 506 is turned ON to trip circuit interrupter 32. Switch 506 is capable of being turned ON in either half cycle polarity of the power line frequency. Since there is little or no delay involved, the response time to fault 312 is typically less than half a line cycle, increasing the chances that device 500, rather than breaker 300, will interrupt a level current arc fault condition 312. Turning attention to the other diodes in OR gate 402', diode D2 still becomes forward biased to interrupt low level arc fault currents to ground and diode D1 still conducts to interrupt arc faults 108,110 that do not represent a current path to ground.

Figure 6:
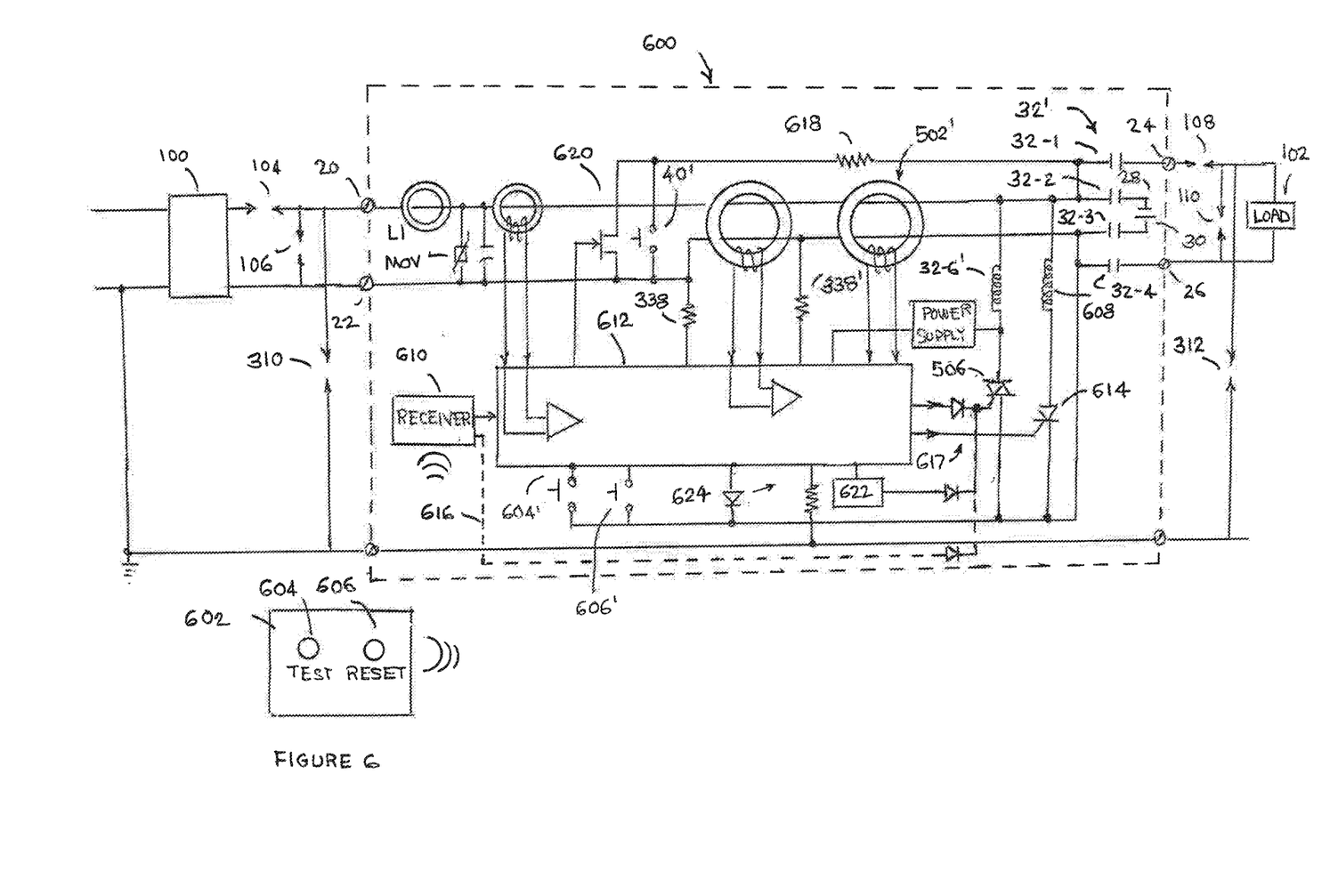
FIG. 6 is a schematic diagram of a protective wiring device according to an embodiment.

Referring to FIG. 6, an alternate embodiment 600 of the invention is shown that is similar to FIG. 5, further including a remote reset and test capability feature. Remote control box 602 has a trip button 604 and a reset button 606 operable from a user-chosen location, e.g. next to an arm chair. When trip button 604 or reset button 606 is manually depressed, control box 602 transmits wireless communication signals to AFCI 600 to respectively trip and reset circuit interrupter 32'. Trip button 604 tests a portion of AFCI device 600 and thus is similar in function to test button 40.

Circuit interrupter 32' is similar to interrupter 32 except it is a latching (or bi-stable) relay employing two solenoids: a trip solenoid 32-6' and a reset solenoid 608. When reset button 606 is manually depressed, the resulting communication signal is received by receiver 610. If processor 612 is operative, SCR 614 turns ON to energize reset solenoid 608 and drive interrupter 32' into the reset state. Whereas interrupter 32 resets mechanically without involving an electronic switch, interrupter 32' of AFCI 600 resets electromagnetically, relying on activation of at least one electronic switch (SCR 614).

When trip button 604 is manually depressed, the resulting communication signal is received by receiver 610. The receiver provides signal to processor 612 which in turn generates a signal simulating a true fault condition. If processor 612 is operative, it sends a signal to switch 506 which turns ON, to energize trip solenoid 32-6' to drive interrupter 32' into its tripped state. For a more complete description of a latching relay, U.S. Pat. No. 8,299,799 issued on Oct. 30, 2012 is incorporated herein by way of reference in its entirety.

In alternate embodiment of the invention, remote box 602 serves as a remote switch for turning load 102 on or off without testing the functionality of device 600. Even when device 600 (or a portion of it) is at end of life and no longer providing arc fault protection, trip button 604 will still serve as a remote switch to turn load 102 off, and reset button 606 will serve as a remote switch to turn load 102 on. Receiver 610 sends a trip signal to OR gate 617 via dotted line 616, bypassing processor 612. Another input of OR gate 617 receives a trip signal from processor 612. OR gate signals switch 506 to turn ON and energize solenoid 32-6' to trip interrupter 32' in response to a signal at its input. Even when processor 612 has reached end of life, OR gate 617 will still signal switch 506 to trip interrupter 32' when trip button 604 has been depressed.

Processor 612 may include circuits described as separate assemblies in other embodiments of the invention and may include additional features. Reset switch 604' and trip switch 606' are similar to remote switches (604,606) except they are integral to AFCI 600, providing signal to processor 612 without reliance on wireless communication. Manual test switch 40', likewise integral to AFCI 600, illustrates how the test function can test at least one fault sensor for an end of life condition. When test switch 40' is depressed, current flows through resistor 618 connected between the phase and neutral conductors, to generate a signal that simulates arc fault 312. In another embodiment of the invention, a test switch causes processor 612 to generate a simulated fault signal to test one or more fault sensor as well as processor 612 (not shown).

AFCI 600 includes other protective features, including an end of life protective feature. Processor 612 activates electronic switch 620 automatically to generate a test signal that simulates at least one fault condition on a predetermined schedule while preventing interrupter 32' from tripping if the AFCI 600 is operational (not experiencing an end of life condition). However, if processor 612 does not generate a test response signal in an expected amount of time, watchdog circuit 622 times out and activates test failure indicator 624 and/or activates switch 506 independently of processor 612, to trip interrupter 32'.

AFCI 600 includes a miswire protective feature. When the line conductors have been miswired to the feed-through terminals (24,26) and are providing power, current flows directly from the feed-through terminals to a load 102 plugged into the receptacle terminals (28,30) without passing through any of the fault sensors. A fault condition in load 102 will remain undetected and uninterrupted. The miswire protective feature detects the miswired condition at the time of installation, preventing interrupter 32' from resetting until AFCI 600 becomes properly wired. Of course, the end of life and the miswire protective features are adaptable to other embodiments of the invention.

AFCI 600 includes a GFCI having a grounded neutral protective feature. As has been described, ground conductor 100-2 is intentionally connected to the neutral conductor at the load center (bond 100-4) but due to frayed wiring, there can be an unintentional grounding on the load side of device 600. When that happens, the fault current 312 does not flow entirely to the grounding conductor or through a spurious ground, rather, some of the fault current is diverted through the frayed wiring and returns on the neutral conductor. When that happens, transformer 332 will not be sensing the entire fault current (not the current returning on the neutral conductor), so the fault might go undetected. Another differential transformer a "grounded neutral transformer" is incorporated for detecting a grounded neutral condition. Differential transformer 502' is a saturating transformer as described for FIG. 5, however it also serving as the grounded neutral transformer. In other words, transformer 502' serves two functions.

For a more complete description of various protective features including those listed above, U.S. patent application Ser. No. 14/806,991 filed Jul. 23, 2015 is hereby incorporated herein by way of reference in its entirety.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as, "has" and "having"), "include" (and any form of include, such as "includes" and "including"), and "contain" (any form of contain, such as "contains" and "containing") are open-ended linking verbs. As a result, a method or device that "comprises", "has", "includes" or "contains" one or more steps or elements. Likewise, a step of method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts and equivalents of all means or step plus function elements in the claims below, if any, are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the present invention for various embodiments with various modifications as are suited to the particular use contemplated.

What is claimed is:

1. An electrical wiring device for installation in a branch circuit of an electrical distribution system for delivering power from a power source to a load, and a circuit breaker being disposed at the origin of the branch circuit comprising:

a housing including a front cover and a back body;

a plurality of line terminals at least partially disposed in the housing and configured to be coupled to upstream portions of the plurality of conductors extending between a circuit breaker at the origin of the branch circuit and the plurality of line terminals;

a plurality of load terminals at least partially disposed in the housing including user load terminals or feed-through load terminals and configured to be coupled to downstream portions of the plurality of conductors extending between the plurality of load terminals to the load;

a protective circuit disposed inside the housing including:

a directional arc fault sensor assembly comprising a sensor element and a filter element, the sensor element being configured to sense at least one fault condition when propagating on the downstream portion of one of the conductors, the filter element being configured to divert the at least one fault signal when propagating on the line portion of the conductor to another of the plurality of conductors, the filter element substantially preventing the sensor element from being able to sense the at least one fault condition when propagating on the upstream portion of the conductor;

an arc fault detector configured to generate an arc fault detection signal when the sensor element generates a sensor signal that exceeding a predetermined threshold;

a switching element configured to generate a trip signal in response to the arc fault detection signal; and a circuit interrupter coupled to the switching element, the circuit interrupter being configured to disconnect the plurality of load terminals from the plurality of line terminals in a tripped state in response to the trip signal, the circuit interrupter being configured to connect the plurality of line terminals and the plurality of load terminals in a reset state, wherein the circuit interrupter remains in the reset state when the fault condition at the predetermined threshold is propagating on the upstream portion of the conductor but enters the tripped state when the fault condition at the predetermined threshold is propagating in the downstream portion of the conductor.

2. The device of claim 1, wherein the filter element includes a capacitor connected across the plurality of line terminals.

3. The device of claim 2, wherein the filter element includes a capacitor connected across the plurality of line terminals in the tripped state.

4. The device of claim 3, wherein a metal oxide varistor (MOV) is connected across the capacitor.

5. The device of claim 1, wherein the filter element includes a capacitor in series with an inductor connected across the plurality of line terminals.

6. The device of claim 1, wherein the sensor element includes a shunt sensor or a toroidal sensor.

7. The device of claim 1, wherein the arc fault sensing assembly includes a toroidal sensor comprising the sensor element and a portion of the filter element.

8. The device of claim 7, wherein the filter element includes a capacitor connected across the plurality of line terminals.

9. The device of claim 8, wherein the filter element includes a MOV connected across the capacitor.

10. The device of claim 1 wherein the plurality of conductors includes a phase conductor, a neutral conductor, and a ground conductor, the device further comprising a cancellation circuit configured to propagate a supplemental current on an upstream portion of the neutral conductor such that the currents flowing on an upstream portion of the phase conductor and the upstream portion of the neutral conductor substantially null.

11. The device of claim 10, wherein the neutral conductor is connected to a line neutral terminal, and the ground conductor is connected to a ground terminal, the cancellation circuit being coupled across the line neutral terminal and the ground terminal.

12. The device of claim 10, further comprising a saturation transformer and a magnitude detector, wherein the saturation transformer is coupled to the phase conductor and the neutral conductor and generates a saturation signal in response to a difference in currents flowing on the phase conductor and the neutral conductor, the magnitude detector signaling the switching element to trip the circuit interrupter when the saturation signal exceeds a predetermined level.

13. The device of claim 1 wherein the plurality of conductors includes a phase conductor and a neutral conductor, the device further comprising a saturation transformer and a magnitude detector, the saturation transformer being coupled to the phase conductor and the neutral conductor and generating a saturation signal in response to a difference in currents flowing on the phase conductor and the neutral conductor, the magnitude detector signaling the switching element to trip the circuit interrupter when the saturation signal exceeds a predetermined level.

14. The device of claim 1, further comprising a differential transformer coupled to the plurality of conductors, the differential transformer providing signal to a differential fault detector, the differential fault detector being configured to generate a differential fault detection signal when the difference in current between a pair of downstream conductors is greater than a predetermined level, the arc fault detector and the differential fault detector being coupled to the switching element by way of an OR gate, the switching element generating the trip signal in response to the arc detection signal or the differential fault detection signal.

15. The device of claim 14, further comprising a saturating transformer coupled to the plurality of conductors, the saturating transformer being coupled to the OR gate via a bypass element that bypasses the differential fault detector, the switching element generating the trip signal in response to a saturating transformer signal having predefined characteristics.

16. The device of claim 15, wherein the bypass element includes a pulse stretching circuit.

17. The device of claim 14, further comprising a saturating transformer coupled to the plurality of conductors, the saturating transformer being coupled to the switching element by way of bypass element that bypasses the differential fault detector, the switching element generating the trip signal in response to a saturating transformer signal greater than a predetermined threshold.

18. The device of claim 1, further including a remote control box having a manually operable reset button and a manually operable trip button capable of driving the circuit interrupter respectively between the reset state and the tripped state using wireless communication.

19. The device of claim 18, wherein the circuit interrupter includes a trip solenoid and a reset solenoid.

20. The device of claim 1 wherein the plurality of conductors includes a phase conductor, a neutral conductor, and a ground conductor, the device further comprising a cancellation circuit configured to propagate a supplemental current on an upstream portion of the neutral conductor such that the currents flowing on an upstream portion of the phase conductor and the upstream portion of the neutral conductor substantially null.

21. The device of claim 20, wherein the neutral conductor is connected to a line neutral terminal and the ground conductor is connected to a ground terminal, the cancellation circuit being coupled across the line neutral terminal and the ground terminal.

22. The device of claim 20, further comprising a saturation transformer and a magnitude detector, wherein the saturation transformer is coupled to the phase conductor and the neutral conductor and generates a saturation signal in response to a difference in currents flowing on the phase conductor and the neutral conductor, the magnitude detector signaling the switching element to generate the trip signal when the saturation signal exceeds a predetermined level.

23. A protective electrical wiring device to be installed in a branch circuit of an electrical distribution system for delivering power from a power source to a load by way of a plurality of conductors, and a circuit breaker being disposed at the origin of the branch circuit providing arc fault protection, the device comprising:
  a housing including a front cover and a back body;
  a plurality of line terminals at least partially disposed in the housing and configured to be coupled to upstream portions of the plurality of conductors extending between the circuit breaker and the plurality of line terminals;
  a plurality of load terminals at least partially disposed in the housing including user load terminals or feed-through load terminals and configured to be coupled to downstream portions of the plurality of conductors extending between the plurality of load terminals to the load;
  a protective circuit disposed inside the housing including:
  a directional arc fault sensor assembly comprising a sensor element and a filter element, the sensor element being configured to sense at least one fault condition when propagating on the downstream portion of one of the conductors, the filter element being configured to divert the at least one fault signal when propagating on the line portion of the conductor to another of the plurality of conductors, the filter element substantially preventing the sensor element from being able to sense the at least one fault condition when propagating on the upstream portion of the conductor;
  an arc fault detector configured to generate an arc detection signal when the sensor element generates a sensor signal exceeding a predetermined threshold;
  a switching element configured to generate a trip signal in response to the arc detection signal; and
  a circuit interrupter coupled to the switching element, the circuit interrupter being configured to disconnect the plurality of load terminals from the plurality of line terminals in a tripped state in response to the trip signal, the circuit interrupter being configured to connect the plurality of line terminals and the plurality of load terminals in a reset state,
  wherein the circuit breaker remains in the reset state when the fault condition at the predetermined threshold is propagating on the downstream portion of the conductor but enters the tripped state when the fault condition at the predetermined threshold is propagating in the upstream portion of the conductor.

24. The device of claim 23, wherein the filter element includes a capacitor connected across the plurality of line terminals.

25. The device of claim 23, wherein the filter element includes a capacitor in series with an inductor connected across the plurality of line terminals.

26. The device of claim 23, wherein the sensor element includes a shunt sensor or a toroidal sensor.

27. The device of claim 23, wherein the arc fault sensing assembly includes a toroidal sensor comprising the sensor element and a portion of the filter element.

28. The device of claim 27, wherein the filter element includes a capacitor connected across the plurality of line terminals.

29. The device of claim 23 wherein the plurality of conductors includes a phase conductor and a neutral conductor, the device further comprising a saturation transformer and a magnitude detector, the saturation transformer being coupled to the phase conductor and the neutral conductor and generating a saturation signal in response to a difference in currents flowing on the phase conductor and the neutral conductor, the magnitude detector signaling the switching element to trip the circuit interrupter when the saturation signal is greater than a predetermined level.

30. The device of claim 23, further comprising a differential transformer coupled to the plurality of conductors, the differential transformer providing signal to a differential fault detector, the differential fault detector being configured to generate a differential fault detection signal when the difference in current between a pair of downstream conductors is greater than a predetermined level, the arc fault detector and the differential fault detector being coupled to the switching element by way of an OR gate, the switching element generating the trip signal in response to the arc detection signal or the differential fault detection signal.

31. The device of claim 30, further comprising a saturating transformer coupled to the plurality of conductors, the saturating transformer being coupled to the OR gate via a bypass element that bypasses the differential fault detector, the switching element generating the trip signal in response to a saturating transformer signal having predefined characteristics.

32. The device of claim 31, wherein the bypass element includes a pulse stretching circuit.

33. The device of claim 30, further comprising a saturating transformer coupled to the plurality of conductors, the saturating transformer being coupled to the switching element by way of bypass element that bypasses the differential fault detector, the switching element generating the trip signal in response to a saturating transformer signal greater than a predetermined threshold.

34. The device of claim 23, further including a remote control box having a manually operable reset button and a manually operable trip button capable of driving the circuit interrupter respectively between the reset state and the tripped state using wireless communication.

35. The device of claim 34, wherein the circuit interrupter includes a trip solenoid and a reset solenoid.

36. A method of protecting a branch circuit in an electrical distribution system coupled to a power source, the branch circuit including a plurality of conductors, each conductor having an upstream portion and a downstream portion, the method comprising:
  actuating a first interrupting device at the origin of the upstream portion of the branch circuit to interrupt power to the branch circuit when an arc fault signal at a threshold of detection propagates in at least one conductor in the upstream portion but not in the downstream portion of one of the conductors;
  actuating a second interrupting device at the origin of the downstream portion of the branch circuit to interrupt power when the arc fault signal at the threshold of detection propagates in the downstream portion of the at least one conductor; and
  not actuating the second interrupting device to interrupt power when the arc fault signal at the threshold of detection propagates in the upstream portion of the branch circuit.

37. The method of claim 36, wherein the at least one arc fault signal includes a current whose frequency is greater than 100 kHz.

38. The method of claim 36, further including the step of resetting the second interrupter to restore power to the at least one conductor using wireless communication.

39. The method of claim 38, further including the step of actuating the second interrupting device to interrupt power to the downstream portion of the at least one conductor using wireless communication.

40. A protective system for protecting a branch circuit in an electrical distribution system, the branch circuit including an upstream portion and a downstream portion, the system comprising:
   a circuit breaker configured to be installed at the origin of the upstream portion of the branch circuit, the circuit breaker having a fault sensor configured to sense an arc fault signal propagating on at least one conductor in the branch circuit, an arc fault detector configured to generate a breaker trip signal when the arc fault signal is greater than or equal to a threshold of detection, and a circuit breaker configured to disconnect the branch circuit from a power source in response to the breaker trip signal; and
   an electrical wiring device configured to be installed at the origin of the downstream portion of the branch circuit, the electrical wiring device including a directional fault sensing assembly having a fault sensing element and a filtering element configured to sense the arc fault signal, a fault detecting element configured to generate a wiring device trip signal when the arc fault signal is greater than or equal to the threshold of detection, and a circuit interrupter configured to disconnect the downstream portion of the branch circuit from the upstream portion of the branch circuit in response to the wiring device trip signal, the filtering element being configured to prevent the arc fault detector from detecting the arc fault signal when located on a downstream portion of the at least one conductor.

\* \* \* \* \*

UNITED STATES PATENT AND TRADEMARK OFFICE
CERTIFICATE OF CORRECTION

PATENT NO. : 11,095,108 B2  
APPLICATION NO. : 16/439212  
DATED : August 17, 2021  
INVENTOR(S) : Thomas N. Packard Page 1 of 1

It is certified that error appears in the above-identified patent and that said Letters Patent is hereby corrected as shown below:

In the Claims

Column 13, Line 18, Claim 1: please remove "that" between "signal" and "exceeding"  
Column 13, Line 62, Claim 10: please add "are" before "substantially"  
Column 14, Line 21, Claim 14: please add "a" between "providing" and "signal"  
Column 14, Line 43, Claim 17: please add "a" between "of" and "bypass"  
Column 14, Line 60, Claim 20: please add "are" before "substantially"  
Column 16, Line 16, Claim 29: please add "a" between "providing" and "signal"  
Column 16, Line 37, Claim 33: please add "a" between "of" and "bypass"

Signed and Sealed this  
Twenty-second Day of March, 2022

Drew Hirshfeld  
*Performing the Functions and Duties of the*  
*Under Secretary of Commerce for Intellectual Property and*  
*Director of the United States Patent and Trademark Office*